(12) United States Patent
Hou

(10) Patent No.: US 8,964,370 B2
(45) Date of Patent: Feb. 24, 2015

(54) DESKTOP CASE WITH DETACHABLE HDD FRAMES

(71) Applicant: NZXT Corporation, El Monte, CA (US)

(72) Inventor: Johnny Hou, El Monte, CA (US)

(73) Assignee: NZXT Corporation, El Monte, CA (US)

( * ) Notice: Subject to any disclaimer, the term of this patent is extended or adjusted under 35 U.S.C. 154(b) by 127 days.

(21) Appl. No.: 13/665,777

(22) Filed: Oct. 31, 2012

(65) Prior Publication Data

US 2014/0071612 A1 Mar. 13, 2014

(30) Foreign Application Priority Data

Sep. 7, 2012 (TW) .............................. 101217330 A

(51) Int. Cl.
*G06F 1/16* (2006.01)
*H05K 5/00* (2006.01)
*H05K 7/00* (2006.01)

(52) U.S. Cl.
USPC ................................ 361/679.37; 361/679.33

(58) Field of Classification Search
CPC ....... G06F 1/187; G06F 1/181; G11B 33/123; H05K 7/1487; H05K 7/1411; H05K 7/14; H05K 7/1488

USPC ............ 361/679.01, 679.02, 679.31, 679.33, 361/679.37

See application file for complete search history.

(56) References Cited

U.S. PATENT DOCUMENTS

| | | | | |
|---|---|---|---|---|
| 5,175,670 | A * | 12/1992 | Wang | 361/679.33 |
| 6,373,697 | B1 * | 4/2002 | Lajara et al. | 361/679.48 |
| 7,660,112 | B2 * | 2/2010 | Carr et al. | 361/679.33 |
| 2007/0236877 | A1 * | 10/2007 | Huang | 361/683 |
| 2012/0243172 | A1 * | 9/2012 | Ross et al. | 361/679.37 |

* cited by examiner

*Primary Examiner* — Bernard Rojas
(74) *Attorney, Agent, or Firm* — Muncy, Geissler, Olds & Lowe, P.C.

(57) ABSTRACT

The present invention discloses a desktop case with detachable HDD frames, wherein the HDD frames are interchangeable and having installation grooves respectively accommodate different numbers of HDDs to meet various HDD configurations involving different HDD quantities and that installed in the different HDD dispositions. Different numbers of HDDs having different functions are respectively installed in the installation grooves of the HDD frames able to accommodate the corresponding numbers of HDDs. Thereby, every HDD frame is utilized efficiently. The user can further detach or interchange the HDD frames to fully utilize the space of the desktop case. Therefore, the present invention provides much flexibility for users to assemble the HDD frames and promotes the space efficiency of the desktop case.

5 Claims, 5 Drawing Sheets

DESKTOP CASE WITH DETACHABLE HDD FRAMES

BACKGROUND OF THE INVENTION

1. Field of the Invention

The present invention relates to a desktop case, particularly to a desktop case with detachable HDD frames.

2. Description of the Related Art

Rapid development of computer hardware technology has continually shortened life cycles of new products and specifications. The users must be troubled by such a situation because they have to spend time and money to purchase new hardware. An established computer environment is normally intended to be used for several months or even several years. Therefore, how to conveniently add or replace hardware in the existing computer environment has been an important subject in computer design.

Among a computer system, the hard disc drive (HDD) is most likely to replace, for maintenance or upgrade. Constrained by space available and wiring layouts, HDD is usually installed in a location where it is easy to mount or dismount without contacting circuits or other components. Some manufacturers have developed HDD frames able to accommodate several HDDs. For the conventional HDD frames, the direction of HDD installation or the number of HDDs mounted are fixed. Therefore, it may occur that the HDD frame cannot accommodate additional HDDs or that the space of the HDD frame cannot be fully utilized. Thus, the user can neither utilize the interior space of the computer case efficiently nor adjust the component configuration inside the computer case arbitrarily. Therefore, the current HDD installation technology still has room to improve.

Accordingly, the present invention proposes a desktop case with detachable HDD frames to overcome the abovementioned problems.

SUMMARY OF THE INVENTION

The primary objective of the present invention is to provide a desktop case with detachable HDD (Hard Disc Drive), frames, which comprises a plurality of detachable HDD frames respectively accommodating different numbers of HDDs, wherein the HDD frames can be arbitrarily detached and interchanged, whereby the HDD frames can be flexibly assembled together in various combinations to meet different HDD configurations, and whereby the HDD frames can be arranged in the desktop case in high space efficiency.

Another objective of the present invention is to provide a desktop case with detachable HDD frames, which is simple structured and easy to operate, wherein the HDD frames can be conveniently detached or assembled to meet different HDD configurations, wherefore is attained the commercial competitiveness in the market.

To achieve the abovementioned objectives, the present invention proposes a desktop case with detachable HDD frames, which comprises a case and a plurality of HDD frames, wherein the case has an HDD accommodation groove accommodating the HDD frames, and wherein the HDD frames respectively accommodate different numbers of HDDs according to the HDD configuration required by the user, and wherein the HDD frames can be flexibly detached and interchanged to make the most of the interior space of the desktop case.

Below, the embodiments are described in detail to make easily understood the objectives, technical contents, characteristics and accomplishments of the present invention.

DETAILED DESCRIPTION OF THE INVENTION

Figure 1:
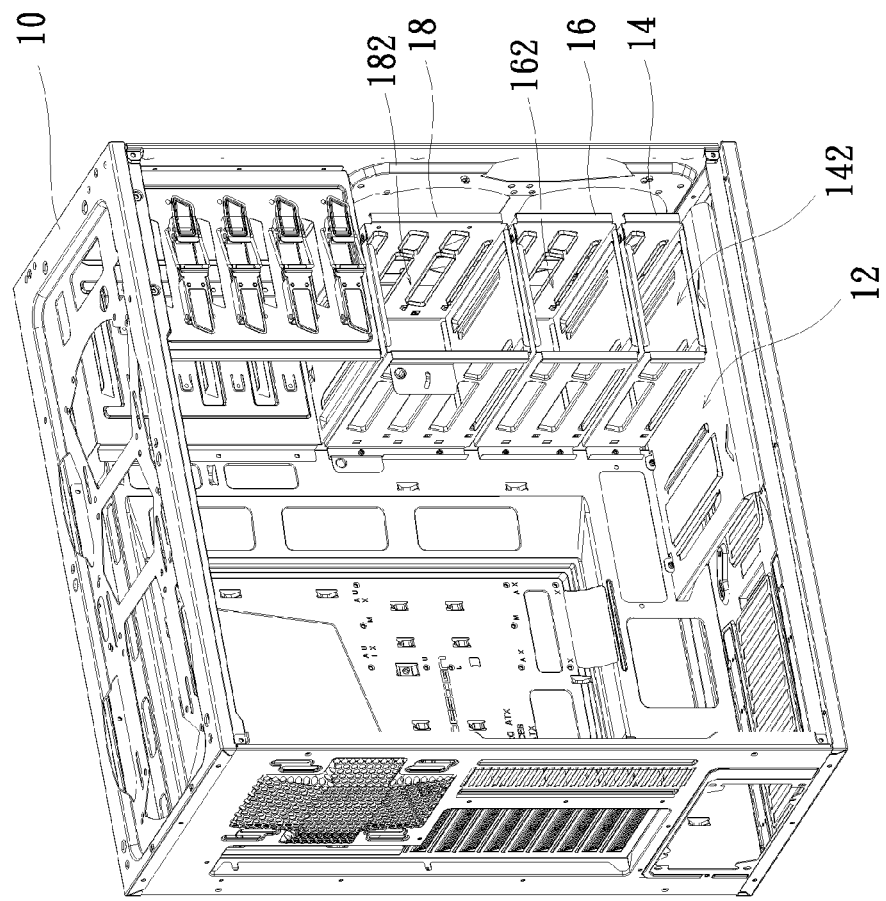
FIG. 1 is a perspective view schematically showing a desktop case with detachable HDD frames according to one embodiment of the present invention.
Figure 2:
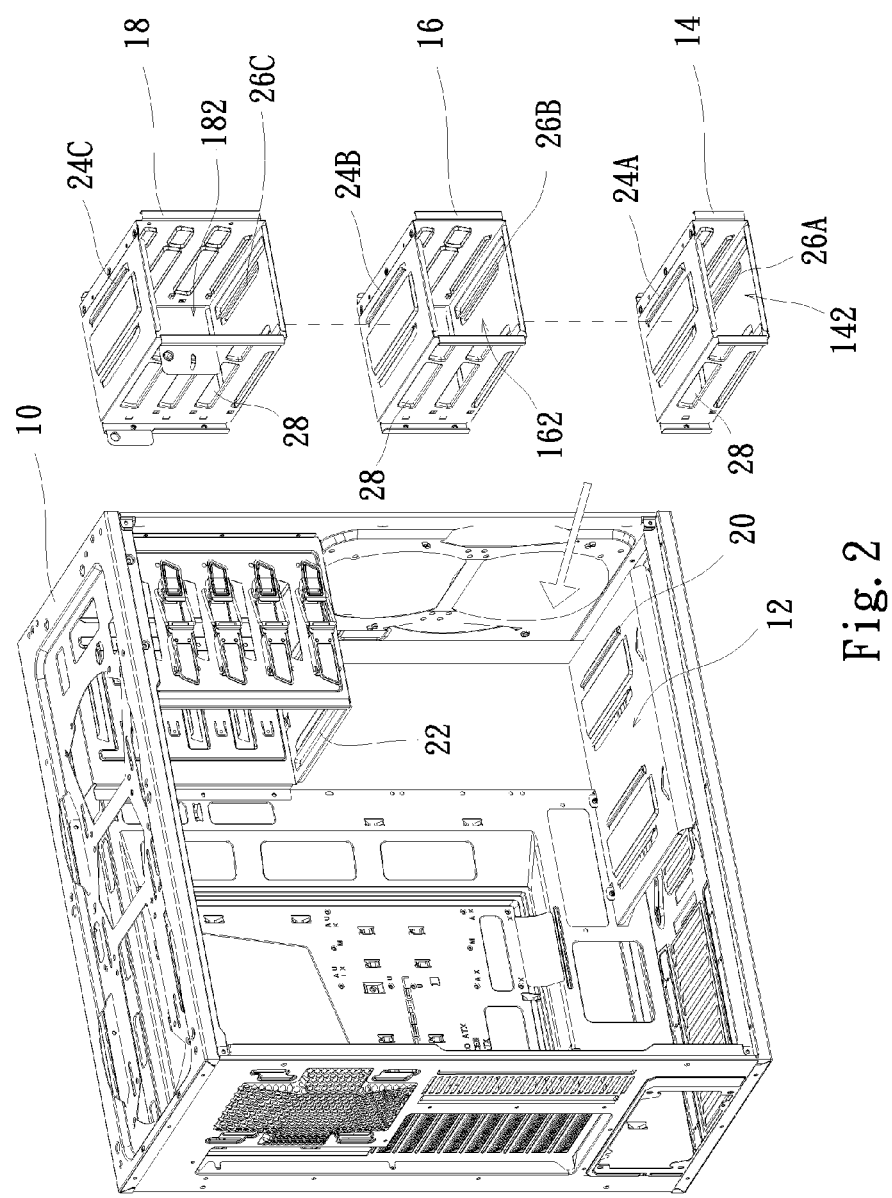
FIG. 2 is an exploded view schematically showing a desktop case with detachable HDD frames according to one embodiment of the present invention.

Refer to FIG. 1 and FIG. 2 respectively a perspective view and an exploded view of a desktop case with detachable HDD (Hard Disc Drive) frames according to one embodiment of the present invention. The desktop case with detachable HDD frames of the present invention comprises a case body 10 and a plurality of HDD frames. The case body 10 is the housing of a desktop computer. The case 10 has an HDD accommodation groove 12. The HDD frames are arranged in the HDD accommodation groove 12. Herein, the HDD frames are exemplified by three HDD frames, including a first HDD frame 14, a second HDD frame 16 and a third HDD frame 18, which respectively have a first installation groove 142, a second installation groove 162 and a third installation groove 182. The three installation grooves can respectively accommodate different numbers of HDDs. For example, the first installation groove 142 can accommodate an HDD; the second installation groove 162 can accommodate two HDDs; the third installation groove 182 can accommodate three HDDs. Thereby, the HDD frames can meet various HDD configurations involving different HDD quantities and different HDD dispositions. The first HDD frame 14, the second HDD frame 16 and the third HDD frame 18 are detachable and interchangeable. The details thereof will be described below.

The HDD accommodation groove 12 has a first snap-fit member and a second snap-fit member respectively arranged on two opposite inner walls, and used to guide the HDD frames to the appropriate positions and secure them. The first snap-fit member is at least one first slide slot 20; the second snap-fit member is at least one first slide block 22 corresponding to the first slide slot 20. Each of the first HDD frame 14, second HDD frame 16 and third HDD frame 18 has a third snap-fit member and a fourth snap-fit member respectively corresponding to the first snap-fit member and the second snap-fit member of the HDD accommodation groove 12. The third snap-fit member is at least one second slide slot; the fourth snap-fit member is at least one second slide block corresponding to the second slide slot.

In assemblage, the second slide block 26A of the first HDD frame 14 is guided into and tight fit fixed to the first slide slot 22. The second slide block 26B of the second HDD 16 is guided into and tight fit fixed to the second slide slot 24A of the first HDD frame 14. Thus, the second HDD frame 16 is stacked on and secured to the first HDD frame 14. Similarly, the second slide block 26C and the second slide slot 24C of the third HDD frame 18 are respectively snap-fitted to the second slide slot 24B of the second HDD frame 16 and the first slide slot 22 of the HDD accommodation groove 12. Thereby, the HDD frames are installed inside the case body 10. As the first HDD frame 14, second HDD frame 16 and third HDD frame 18 respectively have the second slide blocks and the corresponding second slide slots, the neighboring HDD frames can snap-fit to each other via the second slide blocks and the second slide slots. Thereby, the user can arbitrarily detach and interchange the HDD frames according to his requirement. Therefore, the present invention provides much flexibility for users in disposing the HDD frames. Further, the user can mount or dismount the HDD frames without using any hand tool. Therefore, the present invention provides much convenience for users in mounting or dismounting the HDD frames.

Two inner walls of each of the first installation groove 142, second installation groove 162 and third installation groove 182 have fixing members 28 for fixing the HDDs. The number of the fixing members 28 is corresponding to the number of the HDDs to be installed in the installation groove.

Figure 3A:
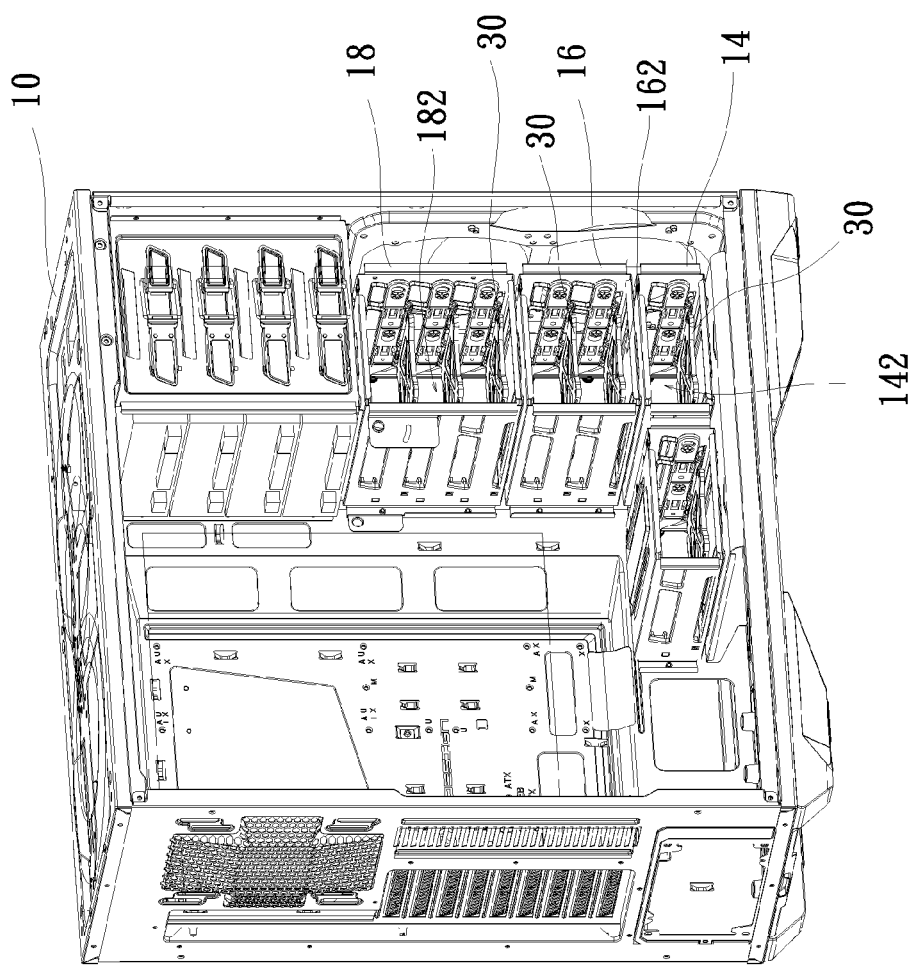
FIG. 3A schematically shows that HDDs have not been installed in a desktop case with detachable HDD frames according to one embodiment of the present invention.

Refer to FIG. 3A schematically showing a desktop case with detachable HDD frames before HDDs are mounted according to one embodiment of the present invention. The frist HDD frame 14, second HDD frame 16 and third HDD frame 18 respectively accommodate different numbers of HDDs. Each the installation groove has different numbers of carrier disks 30 for carrying and securing HDDs.

Figure 3B:
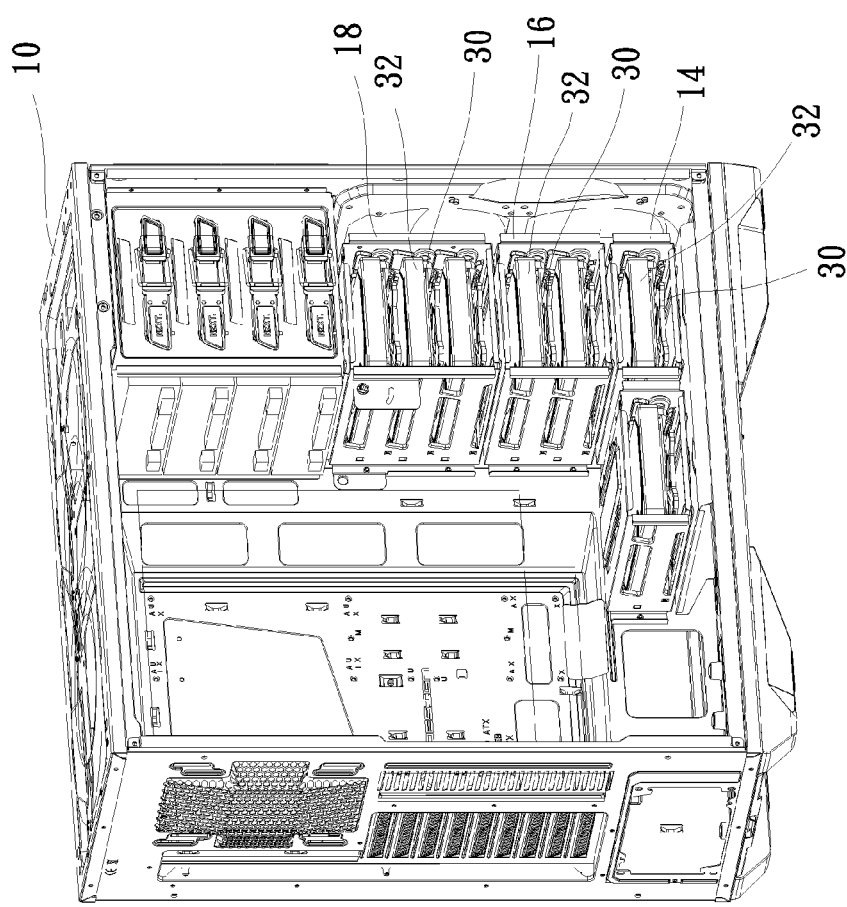
FIG. 3B schematically shows that HDDs have been installed in a desktop case with detachable HDD frames according to one embodiment of the present invention.

Refer to FIG. 3B schematically showing a desktop case with detachable HDD frames after HDDs are mounted according to one embodiment of the present invention. The first installation groove 142 has a carrier disk 30 carrying an HDD 32. The second installation groove 162 has two carrier disks 30 equidistantly arranged and respectively carrying two HDDs 32. The third installation groove 182 has three carrier disks 30 equidistantly arranged and respectively carrying three HDDs 32. In the present invention, the HDD frame can be designed to accommodate the required number of HDDs. Further, the HDD frames can be assembled into different combinations to meet different requirements. Therefore, the interior space of the case body 10 can be efficiently used.

Figure 4:
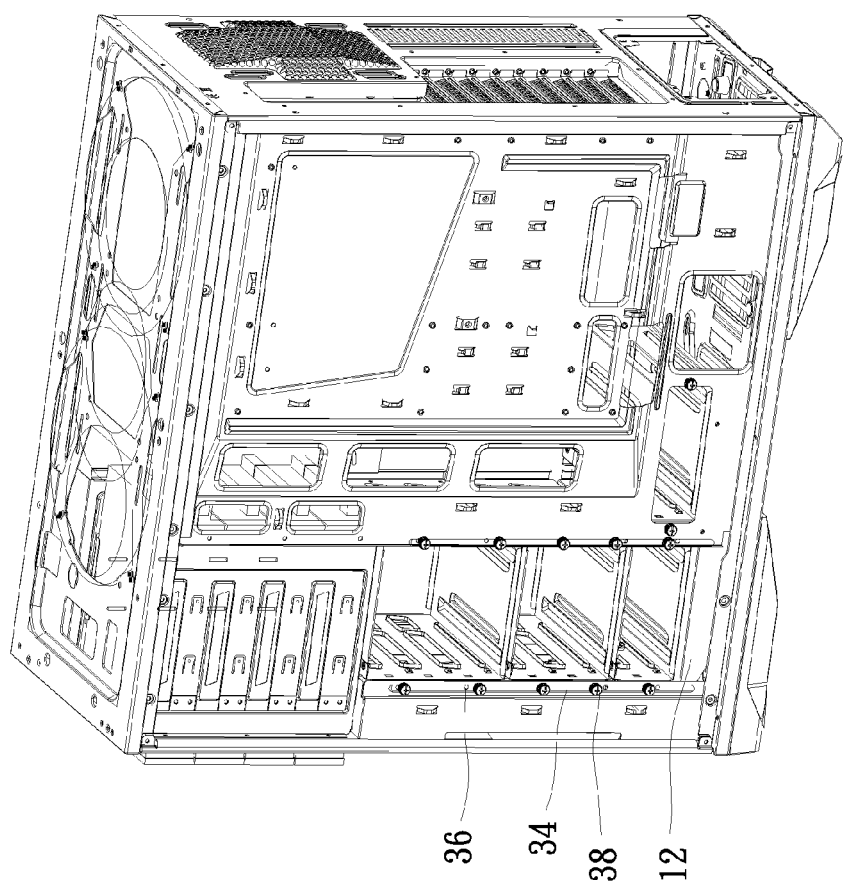
FIG. 4 is a perspective view schematically showing a desktop case with detachable HDD frames according to another embodiment of the present invention.

Refer to FIG. 4 schematically showing the structure of a desktop case with detachable HDD frames according to another embodiment of the present invention. In this embodiment, the sidewall of the HDD accommodation groove 12 has at least one elongated hole 34, and each HDD frame has at least one screw hole 36. The HDD frame is secured to the HDD accommodation groove 12 via screwing at least two screws 38 through the elongated hole 34 into the screw holes 36. In this embodiment, the elongated holes 34 can match the screw holes 36 of an arbitrary HDD interchanged. Therefore, the present invention has flexibility and convenience in mounting HDD frames.

In conclusion, the present invention does not limit the number of HDDs accommodated in an HDD frame. The scope of the present includes any desktop case with HDD frames that are interchangeable and have installation grooves respectively accommodating different numbers of HDDs. The present invention can replace or interchange HDD frames to meet various HDD configurations involving different HDD quantities and different HDD dispositions. Thus, the present invention can efficiently utilize the space of the desktop case. Further, the present invention is simple-structured and easy to operate. Therefore, the present invention has superior competitiveness in the market.

The embodiments described above are only to exemplify the present invention but not to limit the scope of the present invention. Any equivalent modification or variation according to the spirit of the present invention is to be also included within the scope of the present invention.

What is claimed is:

1. A desktop case with detachable hard disc drive frames, comprising
a case body having a HDD accommodation groove; and
a plurality of HDD frames arranged inside said HDD accommodation groove and having installation grooves respectively accommodating different numbers of HDDs, wherein positions of said HDD frames are interchangeable, and wherein two opposite inner walls of said HDD accommodation groove have a first snap-fit member and a second snap-fit member corresponding to said first snap-fit member, and wherein each said HDD frame has a third snap-fit member and a fourth snap-fit member corresponding to said third snap-fit member, and wherein said third snap-fit member of each HDD frame snap-fitted to correspondingly said first snap-fit member, and wherein two neighboring said HDD frames securing to each other via said third snap-fit member and said fourth snap-fit member, and wherein said first snap-fit member is at least one first slide slot, and wherein said second snap-fit member is at least one first slide block corresponding to said first slide slot, and wherein said third snap-fit member is at least one second slide slot, and wherein said fourth snap-fit member is at least one second slide block corresponding to said second slide slot, and wherein said first slide slot snap-fitted to said second slide block, and wherein said first slide block snap-fitting to said second slide slot, and wherein said second slide slot of said HDD frame snap-fitting to said second slide block of another said HDD frame.

2. The desktop case with detachable hard disc drive frames according to claim 1, wherein said two inner walls of said installation groove have fixing members for securing said HDDs, and wherein a count of said fixing members is corresponding to a count of said HDDs to be installed in said installation groove.

3. The desktop case with detachable hard disc drive frames according to claim 1, wherein said installation grooves respectively have different numbers of carrier disks for carrying and securing said HDDs.

4. The desktop case with detachable hard disc drive frames according to claim 1, wherein sidewalls of said HDD accommodation groove has at least one elongated hole, and wherein each said HDD frame has at least one screw hole, and wherein said HDD frame is secured to said HDD accommodation groove via screwing at least two screws through said elongated hole into said screw holes.

5. The desktop case with detachable hard disc drive frames according to claim 1, wherein said case body is a housing of a desktop computer.

* * * * *